(12) United States Patent
Jacobsson et al.

(10) Patent No.: US 8,528,536 B2
(45) Date of Patent: Sep. 10, 2013

(54) DEVICE AND METHOD FOR PROCESSING SLABS OF STONE OR STONE-LIKE MATERIALS

(75) Inventors: Richard Jacobsson, Västerås (SE); Lars Jacobsson, Västerås (SE); Jens Swales, Västerås (SE); Robert Jacobsson, Västerås (SE)

(73) Assignee: Scandinvent AB, Vasteras (CH)

( * ) Notice: Subject to any disclaimer, the term of this patent is extended or adjusted under 35 U.S.C. 154(b) by 507 days.

(21) Appl. No.: 12/679,929

(22) PCT Filed: Sep. 17, 2008

(86) PCT No.: PCT/SE2008/007758
§ 371 (c)(1),
(2), (4) Date: Apr. 27, 2010

(87) PCT Pub. No.: WO2009/040039
PCT Pub. Date: Apr. 2, 2009

(65) Prior Publication Data
US 2010/0258102 A1    Oct. 14, 2010

Related U.S. Application Data

(60) Provisional application No. 60/960,359, filed on Sep. 26, 2007.

(30) Foreign Application Priority Data

Sep. 26, 2007 (SE) ..................... 0702152-0

(51) Int. Cl.
*B28D 1/22* (2006.01)

(52) U.S. Cl.
USPC ........ 125/1; 125/4; 125/8; 125/12; 125/13.01

(58) Field of Classification Search
USPC ................. 451/5, 342, 150, 139, 174; 125/1, 125/4, 135, 12, 8, 13.01; 83/508.2
See application file for complete search history.

(56) References Cited

U.S. PATENT DOCUMENTS

| | | | | |
|---|---|---|---|---|
| 236,824 | A | * | 1/1881 | Morris .......................... 451/236 |
| 701,580 | A | * | 6/1902 | Kotten ............................. 125/8 |

(Continued)

FOREIGN PATENT DOCUMENTS

| | | |
|---|---|---|
| AU | 10652/92 A | 8/1992 |
| AU | 643 591 B2 | 11/1993 |

(Continued)

OTHER PUBLICATIONS

International Search Report dated Feb. 2, 2009 to corresponding international patent application No. PCT/SE2008/007758, filed Sep. 17, 2008, 3 pages.

(Continued)

*Primary Examiner* — George Nguyen
(74) *Attorney, Agent, or Firm* — Maier & Maier PLLC

(57) ABSTRACT

A device for processing a slab of stone or stone-like material, includes a support table, adapted for receiving the slab, and a fixed guide rail running in a first direction along a side of the support table. The device further includes an arm, extending in a cantilevered manner, in a second direction from the guide rail and across at least a portion of the support table. The arm is displaceable relative the guide rail in a third direction. A method for processing a slab of stone or stone-like material is also disclosed.

19 Claims, 5 Drawing Sheets

(56) References Cited

U.S. PATENT DOCUMENTS

| | | | |
|---|---|---|---|
| 839,642 A * | 12/1906 | Reid | 125/8 |
| 1,347,365 A * | 7/1920 | Fletcher | 125/1 |
| 1,398,529 A * | 11/1921 | Straight | 369/173 |
| 1,741,322 A * | 12/1929 | Legge | 125/1 |
| 1,860,117 A * | 5/1932 | Pedersen et al. | 451/342 |
| 1,902,279 A * | 3/1933 | Evans | 451/237 |
| 4,551,902 A * | 11/1985 | Thibaut | 483/33 |
| 4,673,325 A * | 6/1987 | Jago | 414/798.2 |
| 4,674,473 A * | 6/1987 | Stewart | 125/1 |
| 4,940,038 A * | 7/1990 | O'Keefe | 125/13.01 |
| 5,090,159 A * | 2/1992 | Patterson | 451/124 |
| 5,472,367 A * | 12/1995 | Slocum et al. | 451/5 |
| 5,868,185 A * | 2/1999 | Poling et al. | 144/286.5 |
| 5,895,311 A * | 4/1999 | Shiotani et al. | 451/5 |
| 6,006,735 A * | 12/1999 | Schlough et al. | 125/13.01 |
| 6,119,677 A * | 9/2000 | Tebbe | 125/35 |
| 6,170,478 B1 * | 1/2001 | Gorder | 125/12 |
| 6,257,221 B1 * | 7/2001 | Shibuya | 125/8 |
| 6,276,990 B1 * | 8/2001 | Greenland | 451/11 |
| 6,602,110 B2 * | 8/2003 | Yi et al. | 451/9 |
| 6,910,946 B2 * | 6/2005 | Yoon | 451/8 |
| 7,001,248 B1 * | 2/2006 | Chen et al. | 451/14 |
| 7,018,270 B2 * | 3/2006 | Peng et al. | 451/5 |
| 7,387,120 B2 * | 6/2008 | O'Banion et al. | 125/23.02 |
| 7,748,373 B2 * | 7/2010 | Toncelli | 125/35 |
| 7,819,724 B2 * | 10/2010 | Edmonds | 451/342 |
| 7,823,575 B2 * | 11/2010 | O'Banion et al. | 125/23.02 |
| 2001/0044256 A1 * | 11/2001 | Sekiya | 451/5 |
| 2002/0168921 A1 * | 11/2002 | Adachi et al. | 451/5 |
| 2003/0061921 A1 * | 4/2003 | Chen et al. | 83/13 |
| 2005/0136801 A1 * | 6/2005 | Sekiya | 451/5 |
| 2007/0068504 A1 * | 3/2007 | Farnworth et al. | 125/13.01 |

FOREIGN PATENT DOCUMENTS

| | | |
|---|---|---|
| DE | 92 09 217 U1 | 9/1992 |
| DE | 296 10 200 U1 | 10/1996 |
| DE | 10251515 B3 | 9/2004 |
| WO | WO 9319915 A1 * | 10/1993 |

OTHER PUBLICATIONS

Chinese Office Action dated Mar. 4, 2013, as issued in corresponding Chinese Patent Application No. 200880109116.1 (with English Translation—11 pgs.).

* cited by examiner

Section B-B

ID AND METHOD FOR PROCESSING SLABS OF STONE OR STONE-LIKE MATERIALS

DEVICE AND METHOD FOR PROCESSING SLABS OF STONE OR STONE-LIKE MATERIALS

RELATED APPLICATIONS

This application claims priority, under 35 U.S.C. §119, to international patent application No.: PCT/SE2008/007758, filed on Sep. 17, 2008, which claims priority to Swedish patent application No.: 0702152-0, filed Sep. 26, 2007 and U.S. provisional patent application No.: 60/960,359, filed on Sep. 26, 2007, the disclosures of which are incorporated by reference herein in their entireties.

TECHNICAL FIELD

The present disclosure relates to a device and a method for processing slabs of stone or stone-like material. In particular, the present disclosure relates to a CNC (computer numerically controlled) device for cutting or milling a slab into a desired shape, e.g. to provide a countertop for use in a kitchen or a bathroom, or to provide a tombstone, etc.

BACKGROUND

EP 0 836 920 A1 discloses a mobile portal-frame machine for cutting blocks of granite, marble and stone. The mobile portal is arranged to run on a first set of horizontal guide rails, so as to provide a movement in an X-direction, while a carriage comprising the cutting arrangement runs on a second horizontal guide rail on the portal, so as to provide a movement in a Y-direction. A movement in a Z-direction is provided by a pair of vertical guide rails, on which the ends of the second horizontal guide rail are arranged to move. The arrangement of EP 0 836 920 A1 is bulky, and has limited capacity in terms of slab length.

DE 102 51 515 B3 discloses a sawing machine for cutting blocks of stone, having a support table and a pair of guide rails providing a movement in an X-direction, a cross beam, the ends of which engaging the guide rails, on which a carriage comprising the cutting arrangement runs, such as to provide a movement in a Y-direction. A movement in a Z-direction (actually only height adjustment) is provided on the carriage. The arrangement of DE 102 51 515 B3 suffer from the same disadvantages as the one of EP 0 836 920 A1.

Hence, there is a need for an improved device for processing slabs of stone or stone-like material.

SUMMARY

It is a general object of the present disclosure to provide a device, which eliminates or at least alleviates the disadvantages of the prior art.

A specific object is to provide a device for processing slabs of stone or stone-like material, which can be made relatively compact, and thus e.g. capable of being transported in an assembled state, while still having the stability required to allow it so process slabs of stone or stone-like material.

The invention is defined by the appended independent claims. Embodiments are set forth in the appended dependent claims and in the following description and drawings.

According to a first aspect, there is provided a device for processing a slab of stone or stone-like material, comprising a support table, adapted for receiving the slab, and a fixed guide rail running in a first direction along a side of the support table. The device further comprises an arm, extending in a cantilevered manner, in a second direction from the guide rail and across at least a portion of the support table. The arm is displaceable relative the guide rail in a third direction.

A support table may be a work surface which is integrated with the machine, a separate table which is positionable relative the remainder of the device to serve as a work surface, or even a carrier which is movable between different work stations while carrying a slab.

With such a device, it is possible to have the support table open at three sides, with the guide rail running along the fourth side. Thus, it is easy to load slabs onto the support table, and the support table need not be as large as the processed slab, and so it is possible to provide a more compact device.

It is possible to use a single guide rail to provide the movement in the first direction, or a combination of two or more guide rails, with complementary bearings.

The first, second and third directions may be substantially mutually perpendicular.

The device may further comprise a tool carriage, which is displaceable in the second direction along the arm. Thus, the displacement of the tool carriage may provide for a movement in the second direction.

The device may further comprise a cradle, arranged to engage the guide rail and to support the arm. The cradle may comprise a second guide rail, extending in the third direction, along which the arm is arranged to run.

The arm may have a varying thickness in a direction parallel with the third direction. For example, the thickness may be larger near the guide rail than at an outermost portion of the arm. Such an arm may provide for strong attachment to the guide rail, while minimizing the weight and thus self-inflicted deflection of the arm.

The guide rail may be arranged at a distance from the support table, as seen in a direction parallel with the third direction.

In one application, the tool carriage may be arranged to carry a saw blade.

In another application, the tool carriage may be arranged to carry a milling cutter.

The tool carriage may be arranged to carry a tool that is pivotable about an axis parallel with the first direction.

In the alternative, or as a complement, the tool carriage may be arranged to carry a tool that is pivotable about an axis parallel with the second direction.

In the alternative, or as a complement, the tool carriage may be arranged to carry a tool that is pivotable about an axis parallel with the third direction.

Thus, a 3-, 4-, 5- or 6-axial machine may be provided.

The device may further comprise a lifting device for lifting and/or lowering the slab from/to the support table.

The device may further comprise a control device for controlling at least the movements along the first, second and third directions.

The device may further be arranged to provide a feedback to the control device, by which an actual processing speed is derivable.

According to a second aspect, there is provided a method for processing a slab of stone or stone-like material. The method comprises arranging the slab on a support table, displacing a slab-engaging tool relative to the slab. In the method, the tool is displaced in a first direction along a guide rail extending in the first direction along a side of the support table. Furthermore, the tool is displaced in a second direction along an arm, extending in the second direction in a cantilevered manner from the guide rail and across at least a portion of the support table. Finally, the tool is displaced in a third direction by displacing the arm relative the guide rail in the third direction. In the method, the displacements may be numerically controlled.

DESCRIPTION OF EMBODIMENTS

Figure 1:
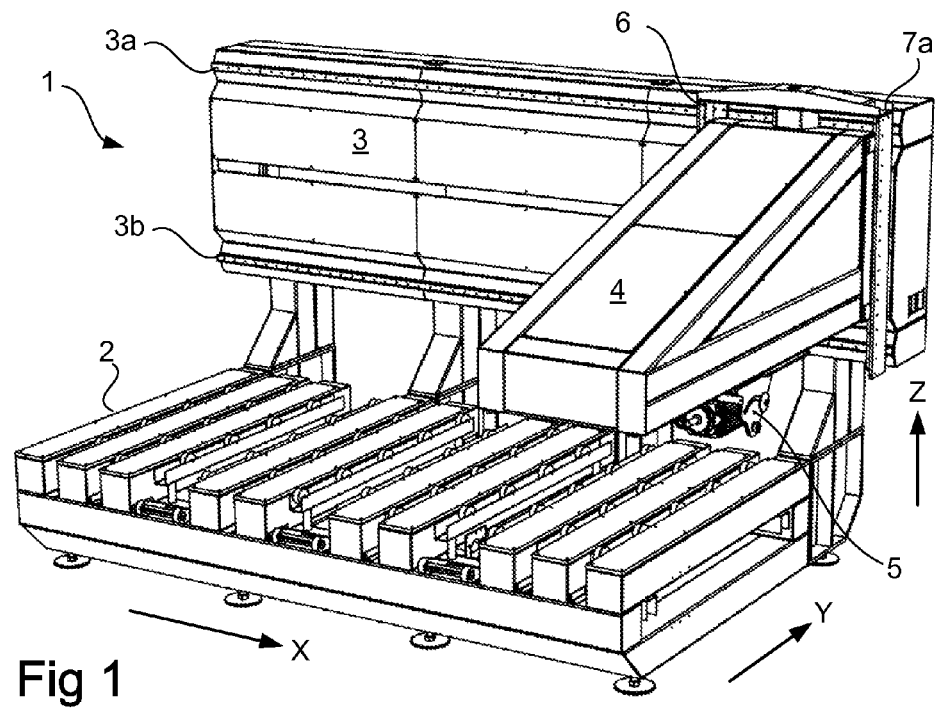
FIG. 1 is a schematic perspective view of a device according to an embodiment of the present disclosure.
Figure 2:
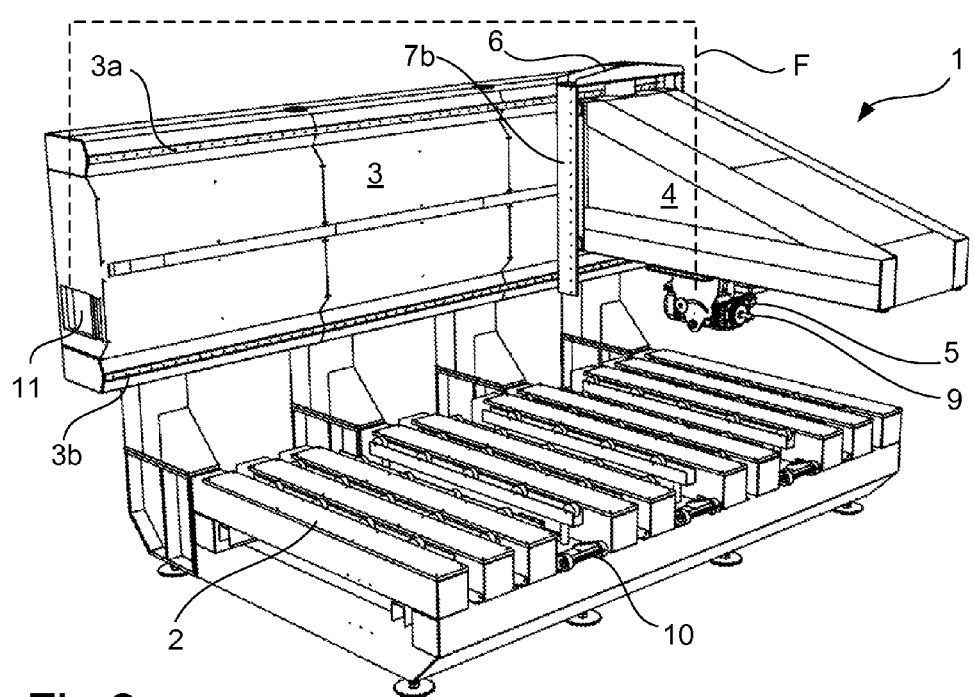
FIG. 2 is a schematic perspective view of the device of FIG. 1, as seen from a different angle.

FIG. 1 schematically illustrates a device 1 for processing slabs of stone or stone-like material. The device comprises a support table 2, which may be substantially horizontal. Along one side of the support table 2, there is a guide rail 3, which defines a first direction X. The guide rail 3 may be fixed relative to the support table and arranged at a higher vertical level as compared to the support table 2. In the disclosed embodiment, the guide rail is arranged on a frame, which projects vertically from a side portion of the support table. Each guide rail may be arranged to guide substantially linearly. Thus, each displacement in the X, Y and/or Z direction may be a substantially linear displacement.

Figure 3:
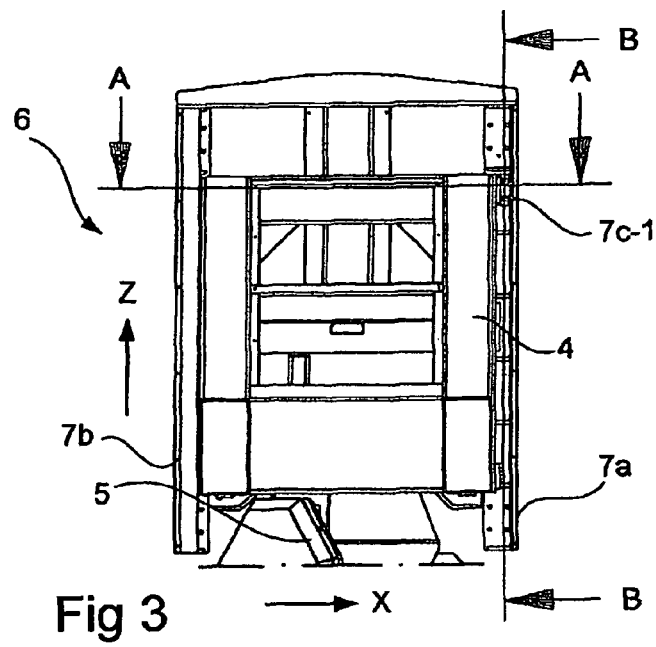
FIG. 3 is a schematic sectional view of a cradle that may be used to enable movements in two directions.
Figure 4:
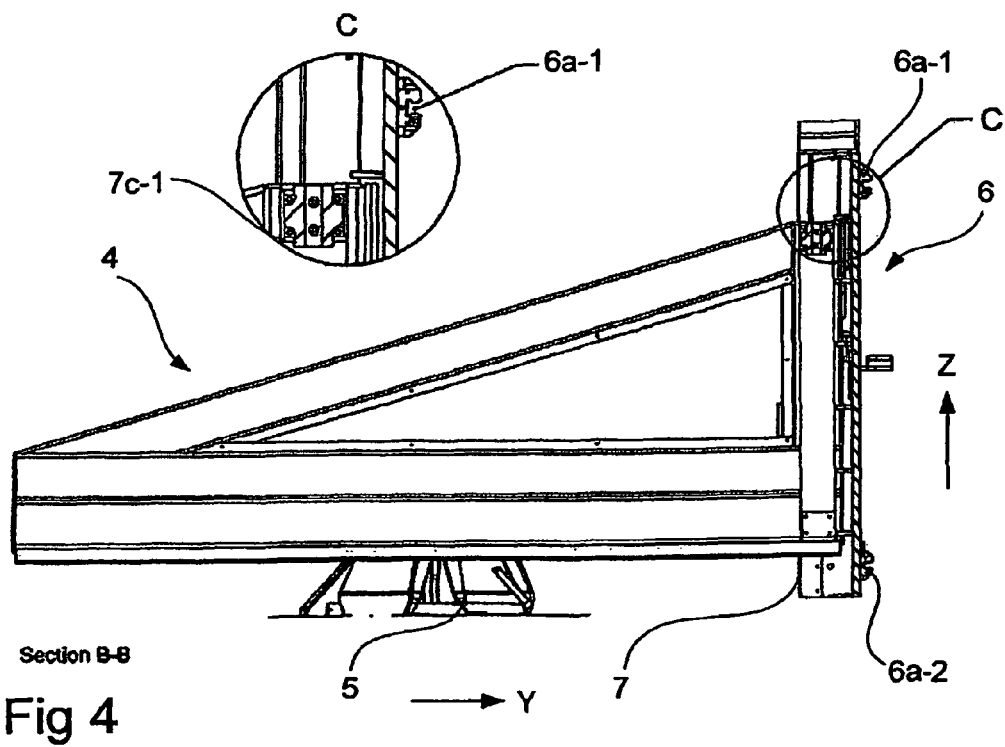
FIG. 4 is a schematic sectional view taken at B-B of FIG. 3, with a partial enlargement thereof.
Figure 5:
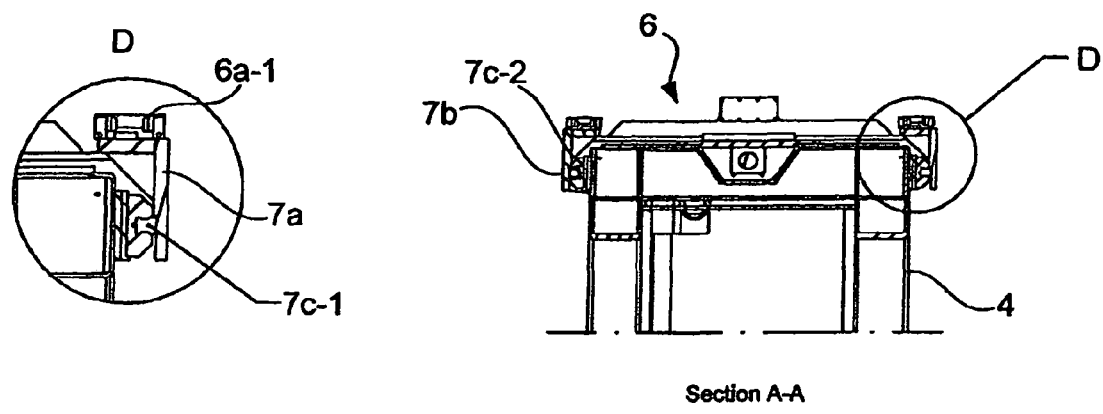
FIG. 5 is a schematic sectional view taken at A-A of FIG. 3, with a partial enlargement thereof.

Referring to FIGS. 3-5, a cradle 6 may be arranged to run in the first direction X along the support guide rail 3. The exact manner in which the cradle 6 is arranged to engage the guide rail 3 may vary. A non-limiting example will be described below.

The cradle 6 may comprise a frame carrying bearings, which engage the guide rail 3. In the illustrated example, there are upper and lower bearings 6a-1, 6a-2, which engage upper and lower rail portions 3a, 3b, respectively. A CNC based drive arrangement (not illustrated) is arranged to move the cradle 6 along the guide rail 3. The bearings may be any type of bearings, including but not limited to roller bearings, fluid bearings or slide bearings.

The cradle 6 may further comprise a guide second guide rail 7, which may run in a substantially vertical direction Z. The second guide rail 7 may be formed as a pair of guide rail portions 7a, 7b, which support a cantilevered arm 4, extending in a second direction Y, such that the arm is displaceable in the third direction Z. The arm 4 has bearings 7c-1, 7c-2 that engage the second guide rail 7. A CNC based drive arrangement (not illustrated) is arranged to move the arm 4 along the second guide rail 7. The bearings may be any type of bearings, including but not limited to roller bearings, fluid bearings or slide bearings.

The arm 4 may carry a tool carriage 5, which is displaceable along the arm in the second direction Y. The tool carriage may carry a drive arrangement, e.g. in the form of a drive motor, which is connected to a tool of the desired type, e.g. a saw blade (not shown), a milling cutter 9 or a polishing tool (not shown).

The arm 4 may have a varying thickness, as seen in the second direction Y. Thus, the portion of the arm closest to the guide rail 3 may be thicker than the free end of the arm.

The arm 4 may extend over at least a portion of the support table in the Y direction. In a specific embodiment, the arm may extend over all of the work surface. In yet another embodiment, the arm may be so arranged that the tool carrier 5 is capable of operating over the entire support table.

The tool carrier 5 may be adapted for positioning the tool in different rotational positions, so as to enable the tool to engage the work piece at different angles. For example, the tool may be rotatable about axes parallel with the first, second and/or third directions X, Y, Z.

The tool carrier 5 may be suspended from a lower surface of the arm 4.

The movements along the first, second and third directions X, Y, Z, and also the rotational positions of the tool, and the tool work rotation, may be computer numerically controlled by a control device 11, possibly with feedback to enable speed and position to be determined.

The support table may be equipped with a lifting/lowering device (not shown) for facilitating handling of slabs in connection with their loading/unloading to/from the support table. The lifting device may be pivotable about hinges 10 provided at a side of the support table.

An embodiment of the device disclosed herein may have support table having a size in the order of 1-2 meters by 2-5 meters, and a height, vertically from the support table, in the order of 1-2 meters. The device may be arranged such that the tool carrier 5 is movable over the entire work surface (entire X-Y plane). The tool carrier 5 may also be movable in the order of 30-100 cm in the Z direction, preferably about 50 cm.

A device and method as described above may also be used for processing other types of material, such as metal or glass. The device may thus be sized and adapted for use in processing smaller or larger work pieces of metal.

The device and method may be used substantially as described herein for processing work pieces of glass.

The device and method may be used substantially as described herein for processing work pieces of wood or wood fiber based materials, such as mdf, hdf, chipboard, etc.

Figure 6A:
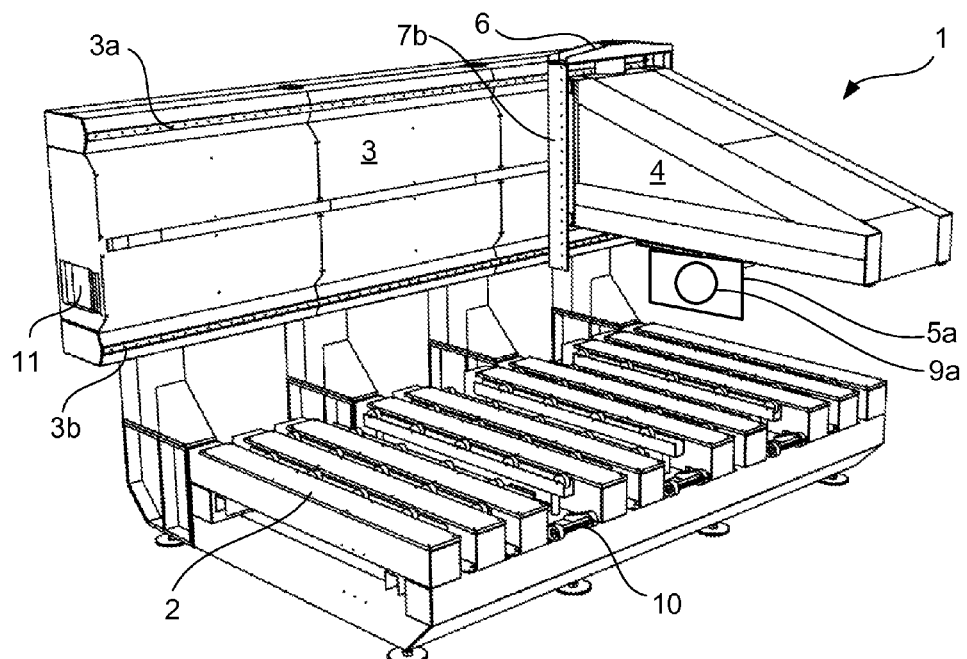
FIGS. 6a-6d show additional embodiments.
Figure 6B:
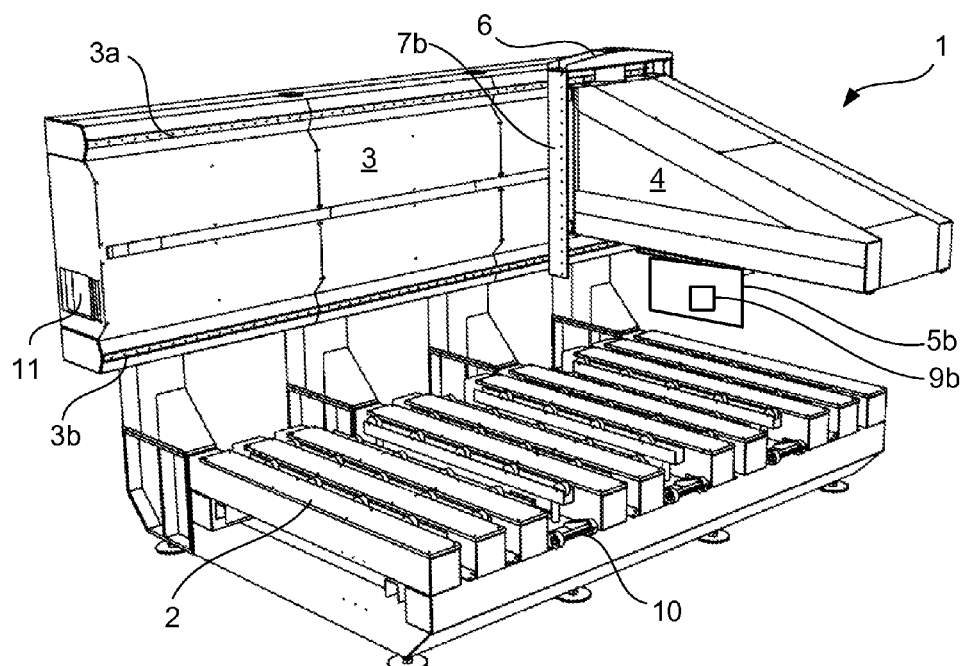

FIG. 6a shows a tool carriage 5a carrying a saw blade 9a. Fig. 6b shows a tool carriage 5b carrying a tool 9b which is pivotable about an axis parallel with the first direction X.

Figure 6C:
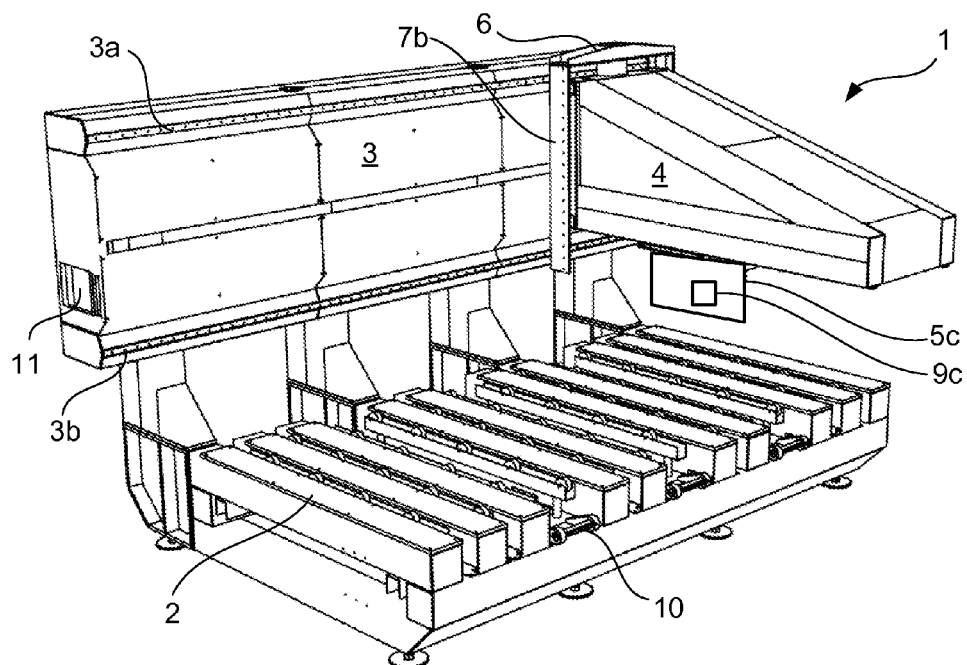

FIG. 6c shows a tool carriage 5c carrying a tool 9c which is pivotable about an axis parallel with the second direction Y.

Figure 6D:
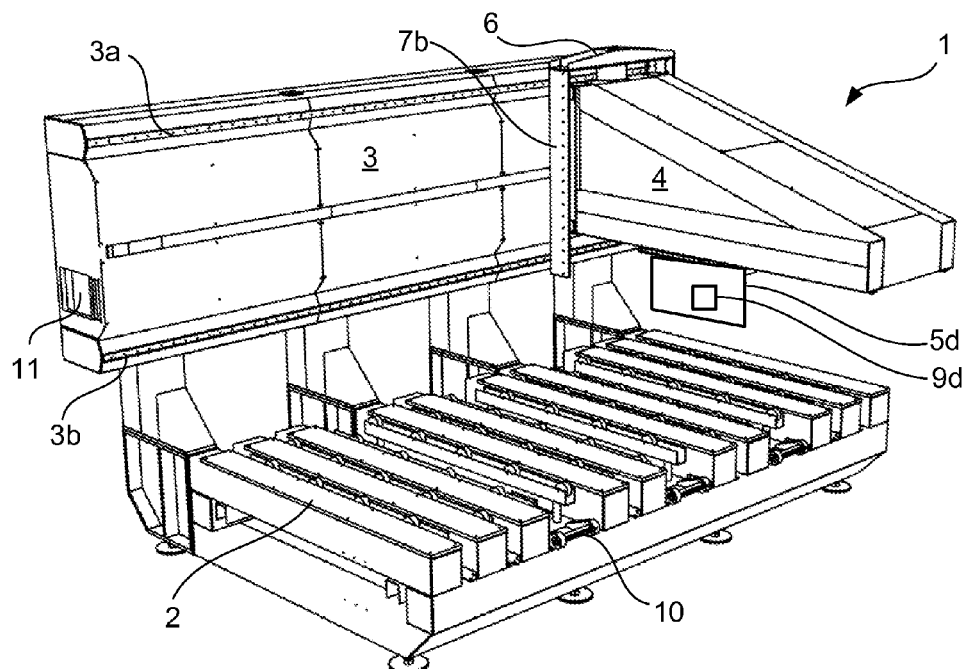

FIG. 6d shows a tool carriage 5d carrying a tool 9d which is pivotable about an axis parallel with the first direction Z.

The invention claimed is:

1. A device for processing a slab of stone or stone-like material, comprising:
    a support table, adapted for receiving the slab, and
    a fixed guide rail running in a first direction along a side of the support table,
    an arm, extending in a cantilevered manner, in a second direction from the guide rail and across at least a portion of the support table,
    a cradle, arranged to engage the guide rail and to support the arm,
    a tool carriage, which is displaceable in the second direction along the arm,
    wherein the arm is displaceable relative the guide rail in a third direction and
    wherein the cradle comprises a second guide rail, extending in the third direction, along which the arm is arranged to run.

2. The device as claimed in claim 1, wherein the first, second and third directions are substantially mutually perpendicular.

3. The device as claimed in claim 1, wherein the arm has a varying thickness in a direction parallel with the third direction.

4. The device as claimed in claim 3, wherein the thickness is larger near the guide rail than at an outermost portion of the arm.

5. The device as claimed in claim 1, wherein the guide rail is arranged at a distance from the support table, as seen in a direction parallel with the third direction.

6. The device as claimed in claim 1, wherein the tool carriage is arranged to carry a saw blade.

7. The device as claimed in claim 1, wherein the tool carriage is arranged to carry a milling cutter.

8. The device as claimed in claim 1, wherein the tool carriage is arranged to carry a tool that is pivotable about an axis parallel with the first direction.

9. The device as claimed in claim 1, wherein the tool carriage is arranged to carry a tool that is pivotable about an axis parallel with the second direction.

10. The device as claimed in claim 1, wherein the tool carriage is arranged to carry a tool that is pivotalbe about an axis parallel with the third direction.

11. The device as claimed in claim 1, further comprising a lifting device for lifting and lowering the slab to and from the support table.

12. The device as claimed in claim 1, further comprising a control device for controlling at least the movements along the first, second and third directions.

13. The device as claimed in claim 12, further comprising a feedback to the control device, by which an actual processing speed is derivable.

14. A method for processing a slab of stone or stone-like material, comprising:
   arranging the slab on a support table,
   displacing a slab-engaging tool relative to the slab,
   displacing the tool in a first direction along a guide rail extending in the first direction along; a side of the support table,
   displacing the tool in a second direction along an arm, extending in the second direction in a cantilevered manner from the guide rail and across at least a portion of the support table, and
   displacing the tool in a third direction by displacing the arm relative the guide rail in the third direction.

15. The method as claimed in claim 14, further comprising numerically controlling the displacements.

16. The device as claimed in claim 1, wherein the movement in the second direction along the arm is numerically controllable by a control device.

17. The device as claimed in claim 1, wherein the fixed guide rail is fixed relative to the support table.

18. The device as claimed in claim 1, wherein the fixed guide rail is arranged at a higher vertical level as compared to the support table.

19. The device as claimed in claim 1, wherein the guide rail is arranged on a frame, which projects vertically upwardly from a side of the support table.

\* \* \* \* \*